US010640931B2

(12) United States Patent
Schmidt et al.

(10) Patent No.: US 10,640,931 B2
(45) Date of Patent: May 5, 2020

(54) ROAD FINISHER WITH LIFTABLE CHASSIS

(71) Applicant: JOSEPH VOEGELE AG, Ludwigshafen/Rhein (DE)

(72) Inventors: Thomas Schmidt, Plankstadt (DE); Tobias Gotterbarm, Neuhofen (DE); Martin Buschmann, Neustadt (DE); Martin Seibel, Bruchsal (DE)

(73) Assignee: JOSEPH VOEGELE AG, Ludwigshafen/Rhein (DE)

( * ) Notice: Subject to any disclaimer, the term of this patent is extended or adjusted under 35 U.S.C. 154(b) by 0 days.

(21) Appl. No.: 16/217,223

(22) Filed: Dec. 12, 2018

(65) Prior Publication Data

US 2019/0177929 A1 Jun. 13, 2019

(30) Foreign Application Priority Data

Dec. 13, 2017 (EP) ..................................... 17206941

(51) Int. Cl.
*E01C 19/48* (2006.01)
*B60G 17/005* (2006.01)

(52) U.S. Cl.
CPC ........ *E01C 19/4873* (2013.01); *B60G 17/005* (2013.01); *E01C 19/48* (2013.01); *B60G 2204/4604* (2013.01); *B60G 2300/09* (2013.01); *B60G 2300/32* (2013.01); *B60G 2500/30* (2013.01); *E01C 2301/00* (2013.01)

(58) Field of Classification Search
CPC .. E01C 19/48; E01C 19/4873; E01C 2301/00; B60G 17/005; B60G 2300/09; B60G 2300/32; B60G 2301/00; B60G 2500/30

USPC .................................... 404/84.05–84.5, 118
See application file for complete search history.

(56) References Cited

U.S. PATENT DOCUMENTS

| 3,552,764 A | 1/1971 | Schwartz |
| 3,901,616 A | 8/1975 | Greening |
| 4,801,218 A | 1/1989 | Musil |
| 5,269,626 A | 12/1993 | Soliman et al. |
| 7,503,412 B2 * | 3/2009 | Francois ................. E01C 19/48 180/9.5 |

(Continued)

FOREIGN PATENT DOCUMENTS

| DE | 29710642 | * 9/1997 ............. E01C 19/48 |
| DE | 299 07 733 U1 | 9/1999 |

(Continued)

OTHER PUBLICATIONS

European Search Report dated Jun. 21, 2018, Application No. EP 17206941.1, 10 Pages.

(Continued)

*Primary Examiner* — Raymond W Addie
(74) *Attorney, Agent, or Firm* — Brooks Kushman P.C.

(57) ABSTRACT

A road finisher includes an undercarriage, a chassis, a hopper, a paving screed, and a lifting device for lifting the chassis relative to the undercarriage at least in a rear region of the road finisher. A locking element can be moved by a locking element actuator between a locked state, in which the locking element mechanically locks the chassis at a predefined transport height relative to the undercarriage, and a release state, in which the mechanical locking of the chassis is released at the transport height.

18 Claims, 4 Drawing Sheets

(56) References Cited

U.S. PATENT DOCUMENTS

| | | |
|---|---|---|
| 8,480,331 B2 | 7/2013 | Schmidt et al. |
| 2015/0102571 A1 | 4/2015 | Slawson |

FOREIGN PATENT DOCUMENTS

| | | |
|---|---|---|
| EP | 0 849 398 A1 | 6/1998 |
| EP | 0849398 B1 | 9/2003 |
| JP | S58-163376 U | 10/1983 |
| JP | S6034079 U | 3/1985 |
| JP | S62-94107 U | 6/1987 |
| JP | H08068006 A | 3/1996 |
| JP | H10183527 A | 7/1998 |
| JP | 2002048236 A | 2/2002 |
| JP | 2008-106514 A | 5/2008 |
| JP | 2012017649 A | 1/2012 |
| JP | 2012172515 A | 9/2012 |
| JP | 2002339314 A | 11/2012 |
| JP | 2013108310 A | 6/2013 |

OTHER PUBLICATIONS

Bomag Fayat Group, CR600 Series Pavers & MTV, www.bomag.com/us, CR600MTV2015 022015, 16 Pages.
Indian Examination Report dated Dec. 19, 2019, Application No. 201814046923, Applicant Joseph Voegele AG, 6 Pages.
Japanese Search Report dated Jan. 30, 2020, Application No. 2018-231482, (with English Machine Translation) total 20 Pages.
Japanese Decision to Grant dated Feb. 28, 2020, Application No. 2018-231482, (with English Machine Translation) total 5 Pages.

\* cited by examiner

ROAD FINISHER WITH LIFTABLE CHASSIS

CROSS-REFERENCE TO RELATED APPLICATIONS

This application claims foreign priority benefits under 35 U.S.C. § 119(a)-(d) to European patent application number EP 17206941.1, filed Dec. 13, 2017, which is incorporated by reference in its entirety.

TECHNICAL FIELD

The present disclosure relates to road finishers with a chassis that can be lifted in relation to the undercarriage at least in a rear region of the road finisher.

BACKGROUND

Known road finishers include a hopper at the front of the road finisher with respect to the paving direction to accommodate paving material. During paving, the paving material is conveyed from the hopper to the rear of the road finisher via a suitable longitudinal conveyor. There, a spreading auger distributes the paving material transverse to the paving direction, thus feeding it evenly to a paving screed pulled behind by the road finisher for compacting the paving material. It is known from practice to attach the spreading auger to the road finisher chassis in a height-adjustable manner. By adjusting the height of the spreading auger relative to the chassis, the road finisher can be adapted for paving different layer thicknesses. For example, the spreading auger can be lifted relative to the chassis to pave thicker layers.

A disadvantage of such a system is that for paving very thick layers the position of the auger relative to the chassis is significantly changed upwards. This can lead to a situation where the spreading auger at least partially blocks a material outlet of the longitudinal conveyor. This reduces the throughput of paving material to the paving screed, which is particularly disadvantageous with large layer thicknesses, as these require an increased quantity of paving material.

From EP 0 849 398 A1, a road finisher is known whose rear section can be lifted for paving thick layers. This is achieved by providing a vertical guidance, which can be adjusted in height by means of a hydraulic positioning cylinder, between a crawler undercarriage and a chassis of the road finisher. At the front, the chassis is rotatably mounted on the crawler undercarriage. A disadvantage of this system is the high loads on the hydraulic positioning cylinders, which essentially carry the weight of the lifted chassis completely. Therefore, stability of the road finisher also suffers.

Other road finishers with a chassis that can be lifted at least in a rear region are known from U.S. Pat. No. 4,801,218 A and 3,901,616 A. Also, here high forces act on hydraulic positioning cylinders, which carry the weight of the chassis essentially completely.

From the brochure "CR600 SERIES PAVER & MTV" from BOMAG, a further system for lifting the chassis in relation to the undercarriage in the rear region of a road finisher is known as "Frame Raise System". In this system, a large circular disc is arranged vertically at the chassis in the paving direction of the road finisher. The disc is rotatably mounted along its circumference on the chassis. The disc can thus be rotated around a main axis of rotation running through its center and transverse to the direction of the road finisher. Eccentrically to the main axis of rotation, a connection to the road finisher's undercarriage is provided on an outer surface of the disc which can be rotated about a side axis transverse to the paving direction. The disc can be rotated in its support on the chassis by means of a hydraulic cylinder. When the disc is rotated, the eccentricity of the connection between the disc and the undercarriage changes the mutual height relationship between the chassis and the undercarriage at the rear of the road finisher. Although the weight of the chassis no longer has to be borne entirely by the hydraulic cylinder, this system still has to apply high forces to rotate the disc when lifting the chassis. Also, when holding the chassis in a certain height position, high loads are applied to the hydraulic cylinder.

SUMMARY

It is an object of the disclosure to provide a road finisher with a chassis that can be lifted relative to the undercarriage in a rear region of the road finisher, in which the mechanical load on the corresponding lifting mechanism is reduced as far as possible and in which the lifting mechanism can be used as efficiently as possible.

A road finisher according to the disclosure comprises an undercarriage and a chassis supported by the undercarriage. A road finisher according to the disclosure may comprise an undercarriage designed as a crawler track. However, it would also be conceivable to apply the disclosure to a road finisher with a wheeled undercarriage. With regard to a paving direction at the front of the road finisher, a hopper is fitted to the chassis to accommodate paving material. With regard to the paving direction at the rear of the road finisher, a paving screed is mounted on the chassis, in particular articulated, by means of traction bars for compacting paving material.

The road finisher also includes a lifting device adapted to lift the chassis in relation to the undercarriage at least in a rear region of the road finisher. Preferably the lifting device allows a stepless adjustment of the height of the chassis in relation to the undercarriage. However, it would also be conceivable that discrete relative positions between the undercarriage and the chassis could be adjusted by means of the lifting device.

The road finisher also comprises a locking element that can be moved between a locked state and a release state. In the locked state, the locking element mechanically locks the chassis with respect to the undercarriage at a predefined transport height. When the locking element is in the locked position, the locking element mechanically prevents the chassis from being lifted above the transport height or lowered below the transport height, but there may be some play around the transport height. In the release state of the locking element, the mechanical locking of the chassis at the transport height is released. The road finisher comprises a locking element actuator for moving the locking element between the locked state and the release state. Preferably, the transport height is predefined as a height setting of the chassis in a range between a maximum lowered state of the chassis and a maximum lifted state of the chassis. In this case, the chassis can be adjusted both downwards and upwards from the transport height relative to the undercarriage when the locking element is in the release state. The transport height can be pre-defined as a height setting for the chassis, which is preferred for transporting the road finisher between construction sites. Preferably, the chassis is lifted to a certain degree in the transport height relative to the undercarriage, but it is also not lifted too high so that the road finisher is as compact as possible during a transport run.

Preferably, the total height of the road finisher should not exceed three meters, 3.1 meters or four meters if the chassis is at the transport height. Thereby, the roof of one of the main operating stations of the road finisher can be either folded down or not folded down.

The mechanical locking of the chassis in relation to the undercarriage at the transport height relieves the load on the lifting device. Mechanical locking of the chassis in its height position is particularly useful when the road finisher is travelling between construction sites, as the lifting device does not have to be operated during such a travel. In addition, higher speeds and vibrations occur increasingly during transport travels, so that a particular load is exerted here. The mechanical locking by the locking element also acts as an additional safeguard against chassis sagging.

The road finisher may also include a control device which is configured to control the lifting device to selectively lift or lower the chassis relative to the undercarriage and to control the locking element actuator to move the locking element between the locked state and the release state. Preferably, the control device also controls other functions of the road finisher. For example, the control device may be configured to control a drive unit for the driving function of the road finisher. The control device can also be used to control the functions of the paving screed. The control device can be provided as a centralized element in the road finisher. However, it is also conceivable that individual components of the control device could be distributed over the road finisher.

The road finisher can also be equipped with a mode selection input device which allows the user to select one of several operating modes. The control device may be configured to control the lifting device and the locking element actuator according to different control schemes depending on the selected operating mode. This ensures that the lifting device and the locking element actuator are operated in accordance with the respective operating situation of the road finisher without the user having to worry about details. In this way, the operation of the road finisher can be optimized, and operating errors can be prevented.

A transfer operating mode can be selected using the mode selection input device. The control device may be configured to automatically move the chassis to the transport height by controlling the lifting device when the transfer mode is selected and, after moving the chassis to the transport height, to control the locking element actuator to move the locking element to the locked position. The control device may also be configured to allow both forward and reverse travel of the road finisher in the transfer mode. By selecting the transfer mode, the road finisher can easily be brought into a condition suitable for transport between job sites.

Preferably, the control device is configured to limit, in the transfer mode, a driving speed of the road finisher to a predetermined maximum value, such as 25 m/min or less than 25 m/min, until the chassis is locked at the transport height, and to release higher driving speeds only after locking. This prevents possible loads from acting on the lifting device at higher speeds. Once the chassis has been locked in the transport position, the higher speeds are released so that the road finisher can be moved quickly.

The mode selection input device can be used to select a setting operating mode. The control device may be configured to automatically move the locking element to the release state when the setting mode is selected. Of course, if the locking element is already in the release state when the setting mode is selected, this step is not required. The control device may be configured to adjust the height of the chassis by controlling the lifting device in the setting mode. This allows the control device to adjust the height of the chassis based on user input, for example. For example, the desired height positions of the chassis relative to the undercarriage can be entered directly by a user, or a desired change from a current state can be entered. Alternatively, it would be conceivable for the control device to carry out the height adjustment of the chassis in the setting operating mode based on an automatic setting program. In particular, this can be done completely without the need for user input. Mixed forms are also conceivable, where the control unit basically controls the lifting device based on an automatic setting program, but intervention by user input is possible. The control device can also be configured to allow both forward and reverse travel of the road finisher in the setting mode. The road finisher's setting operating mode is particularly suitable for moving the road finisher to a starting configuration immediately before paving begins.

A paving operating mode can be selected using the mode selection input device. The control device may be configured to automatically move the locking element to the release state when the paving operating mode is selected. Of course, if the locking element is already in the release state when the paving mode is selected, this step is not required. The control device may be configured to adjust the height of the chassis by controlling the lifting device in the paving mode. For example, the control device can control the lifting device based on user input, particularly user input indicating a desired height position of the chassis relative to the undercarriage or a change relative to a current height position of the chassis. Alternatively, it would also be conceivable for the control device to control the lifting device in the paving operating mode based on an automatic paving program. For example, a chassis height could be permanently adjusted during paving by means of a control or regulation procedure to a road thickness that is currently to be paved. However, mixed forms are also conceivable, for example in such a way that control is basically based on an automatic paving program, but intervention by user input is also possible. The paving operating mode is particularly suitable for use during a paving operation.

Preferably, the control device is configured to allow the road finisher to move forwards in the paving operating mode and to prevent the road finisher from reversing. This prevents a defect in the paved roadway from occurring if the paver is accidentally reversed during the paving operation.

Preferably, the control device is configured to adjust the chassis height in the setting mode at a higher adjustment speed than in the paving mode. This ensures that the chassis can be quickly moved to the desired starting position in the setting operating mode. In paving mode, on the other hand, the chassis height is only changed slowly so as not to endanger paving quality during paving.

A neutral operating mode can be selected using the mode selection input device. The control device may be configured to prevent the chassis height from being adjusted by the lifting device in neutral mode. Neutral mode can be used, for example, during pauses when only a heating function of the road finisher is required. In such situations, in order to prevent accidental height adjustment of the chassis, which would result in a loss of the current setting, the possibility of height adjustment is deactivated in the neutral operating mode.

In accordance with an advantageous embodiment, the mode selection input device can be used to select from the transfer mode, the setting mode, the paving mode and the neutral mode. However, it is also conceivable that further selectable operating modes are provided and/or one or more of the operating modes are not present.

Preferably, the road finisher also comprises a display device, the control device being adapted to drive the display device to indicate a current lifting state of the chassis with respect to the undercarriage. This allows an operator to see the current chassis setting status at any time and to control the road finisher based on this.

The control device may comprise a rocker which is mounted at an undercarriage-side bearing surface (a bearing surface which is part of the undercarriage or at least firmly connected to the undercarriage) so that it can rotate about an undercarriage rotation axis. In addition, the rocker is mounted at a chassis-side bearing surface (a bearing surface which is part of the chassis or at least firmly connected to the chassis) so that it can rotate about a chassis rotation axis. Preferably, the undercarriage rotation axis and the chassis rotation axis are parallel to each other and each run in particular in a horizontal plane and perpendicular to the direction of paving, i.e., in a transverse direction of the road finisher. In particular, the undercarriage rotation axis and the chassis rotation axis are not identical. Preferably, the undercarriage rotation axis and the chassis pivot axis are offset parallel to each other.

The lifting device may also include a length-variable adjustment element. The length-variable adjustment element connects a chassis-side link point (a link point which is part of the chassis or at least fixed to the chassis) to a rocker-side link point (a link point which is part of the rocker or at least fixed to the rocker). In particular, the length-variable adjustment element is hinged to the chassis-side link point and the rocker-side link point. Preferably a first end of the length-variable adjustment element is hinged to the chassis-side link point and a second end of the length-variable adjustment element is hinged to the rocker-side link point. However, it is also conceivable that the length-variable adjustment element may extend beyond the respective link point on one or both sides. The length-variable adjustment element is configured to change the distance between the chassis-side link point and the rocker-side link point by changing its length, thus selectively lifting or lowering the chassis relative to the undercarriage.

Preferably a minimum distance between the chassis rotation axis and the undercarriage rotation axis is greater than a distance between the chassis rotation axis and the chassis-side bearing surface. This can mean that the undercarriage rotation axis is outside the rocker bearing on the chassis. This can result in improved power transmission when lifting or holding the chassis. In addition, the lifting device can be designed to be compact.

Preferably, the length-variable adjustment element is configured to change the position of the rocker relative to the undercarriage or chassis by changing its length.

The length-variable adjustment element preferably extends at least substantially along a horizontal direction. Thus, the weight of the chassis acting at least essentially along a vertical direction is at least partially taken up by the rocker or the chassis-side and undercarriage-side bearing surfaces and does not have to be completely borne by the length-variable adjustment element. This contributes to the stability of the entire arrangement. The fact that the length-variable adjustment element extends at least substantially along a horizontal direction may mean that a horizontal component of the direction of extension of the length-variable adjustment element is greater than a vertical component of the direction of extension of the length-variable adjustment element and/or that an angle of inclination between the length-variable adjustment element and a horizontal plane does not exceed 10°, 15°, 25° or 45°.

The chassis-side link point is preferably located at least in some operating positions in front of or behind the chassis rotation axis and/or the undercarriage rotation axis in relation to the direction of paving. A good power transmission can thus be achieved due to a leverage effect.

A lower abutment can be provided at the chassis, which is configured to secure the chassis against further lowering by engaging the rocker when the chassis is in a maximum lowered state. This relieves the load on the length-variable adjustment element when the chassis is in its maximum lowered state. In addition, the maximum lowered state of the chassis is firmly defined by the abutment. The lower abutment also serves as a safety device in the event of a malfunction of the lifting device.

An upper abutment can be provided at the chassis, which can be configured to secure the chassis against further lifting by engaging the rocker when the chassis is in a maximum lifted state. As an alternative or in addition, the upper abutment can also serve as a safety device against overturning (swinging through) of the lifting device.

The length-variable adjustment element may be a hydraulic cylinder. A hydraulic cylinder can be easily integrated into a hydraulic system usually provided on a road finisher and allows large forces to be transferred. Alternatively, the length-variable adjustment element could also be a spindle drive. This could provide a purely mechanical solution.

The locking element can be a locking bolt provided at the chassis which can be extended to engage a locking structure, such as an opening or recess in the rocker. In particular, the locking element can be extended horizontally, in particular perpendicularly to the paving direction.

The chassis can be pivotally attached to the undercarriage in the front region of the road finisher so that there is no tension between the chassis and the undercarriage when the chassis is lifted asymmetrically along the paving direction.

To avoid tensions, the chassis can be mounted on the undercarriage in a front region of the road finisher such that it can be displaced longitudinally in relation to the direction of paving.

Preferably, the road finisher comprises a spreading auger for distributing paving material in front of the paving screed transversely to the direction of travel. The road finisher can also be equipped with a conveyor device for conveying paving material from the hopper to the spreading auger. The spreading auger can be fixed to the chassis in a fixed position relative to the chassis. Since the chassis can be lifted in relation to the undercarriage as a whole, it is not necessary to adjust the height of the spreading auger in relation to the chassis, thus achieving greater stability. Lifting the chassis with the spreading auger attached to it as a whole does not alter the spatial relationship between the spreading auger and a material outlet of the conveyor device. There is no blocking of the material outlet when the chassis is lifted to achieve high paving thicknesses.

In the following, the disclosure will be explained in more detail using an embodiment with reference to the attached drawings.

DETAILED DESCRIPTION

Figure 1:
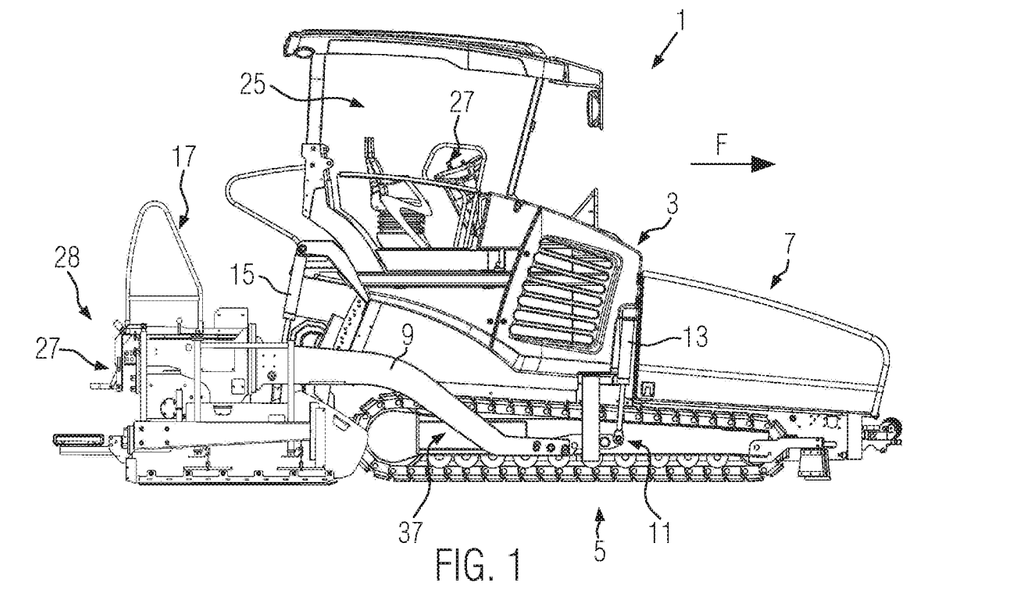
FIG. 1 shows a schematic side view of a road finisher according to an embodiment.

FIG. 1 shows a schematic side view of a road finisher 1 according to the disclosure according to an embodiment. The road finisher 1 comprises a chassis 3 and an undercarriage 5, in this case a crawler track. In paving direction F at the front, a hopper 7 for receiving paving material is fitted to chassis 3. On both lateral sides of road finisher 1, with regard to paving direction F, a pulling arm 9 is mounted on chassis 3 via a height-adjustable link point 11. The link point 11 can be adjusted in height on the road finisher 1 by means of a linkage hydraulic cylinder 13. At the rear of the road finisher 1, the pulling arms 9 are attached to both sides of the chassis 3 via height-adjustable rear hydraulic cylinders 15. A paving screed 17 for compacting paving material is suspended from the rear end of the pulling arms 9 with respect to paving direction F. During paving, the paving screed 17 is pulled by the pulling arms 9 floating on the paving material behind the road finisher 1. In chassis 3, a conveyor device 19 is provided for conveying paving material from hopper 7 to a rear region of the road finisher 1. In the rear region of the road finisher 1, the paving material leaves conveyor device 19 through a material outlet 21 and reaches a spreading auger 23 fixed to the chassis 3 for distributing the paving material in front of paving screed 17 transversely to paving direction F. The spreading auger 23 and the material outlet 21 are concealed in FIG. 1 but shown in FIG. 2. A main control station 25 is provided on the chassis 3 of the road finisher 1, which provides space for an operator and includes an input device 27 for making inputs for controlling the road finisher 1. The road finisher 1 also includes an external operating station 28 provided on paving screed 17, which also includes an input device 27 for making inputs for controlling the road finisher 1.

Figure 2:
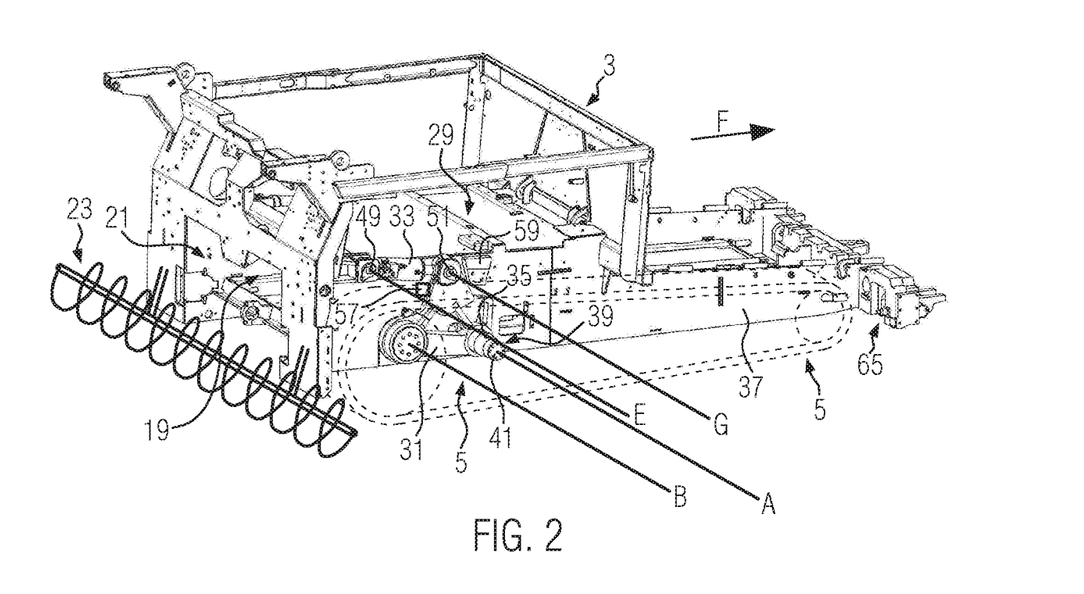
FIG. 2 shows a schematic perspective view of the chassis and the undercarriage of the road finisher according to the embodiment.

FIG. 2 shows a schematic side view of the undercarriage 5 and the chassis 3 of the road finisher 1, whereby for reasons of clarity various superstructures, components and claddings are not shown. A lifting device 29 for lifting the chassis 3 relative to the undercarriage 5 in the rear region of the road finisher 1 is provided in a rear region of the chassis 3 with respect to the paving direction F. The lifting device 29 comprises a rocker 31 on each of the two lateral sides of the road finisher 1 as well as a length-variable adjustment element 33. In the following, the design and function of the lifting device 29 are described for only one side of the road finisher 1. The opposite side can be of the same design.

The rocker 31 is rotatably mounted around an undercarriage rotation axis A at an undercarriage-side bearing surface 35. As shown in FIG. 2, a track carrier 37 of the undercarriage 5 comprises a cylindrical recess 39, the inner wall of which forms the undercarriage-side bearing surface 35. In the recess 39 a cylindrical extension 41 of the rocker 31 extending along the undercarriage rotation axis A is rotatably accommodated. Alternatively, it would also be conceivable that a corresponding recess would be provided in the rocker 31 and a cylindrical extension of the track carrier 37 would be accommodated in it rotatably about the undercarriage rotation axis A. In this case, the undercarriage-side bearing surface 35 would be formed by the circumferential surface of the extension.

Figure 3A:
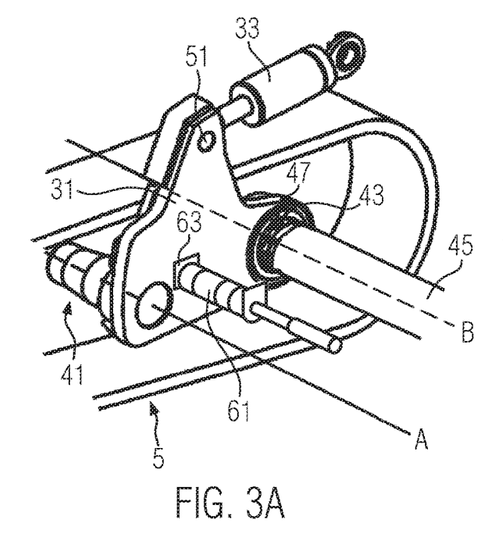
FIG. 3A shows a schematic perspective view of the lifting device of the road finisher according to the embodiment, wherein the locking element is shown in the release state.
Figure 3B:
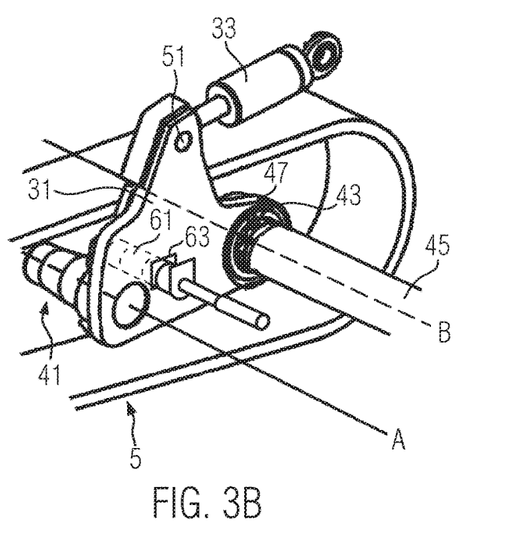
FIG. 3B shows a schematic perspective view of the lifting device of the road finisher according to the embodiment, wherein the locking element is shown in the locked state.

In addition, the rocker 31 is mounted on a chassis-side bearing surface 43 so that it can rotate about a chassis rotation axis B. As can be seen from the schematic view of the inner surface of the rocker 31, which is not visible in FIG. 2, as shown in FIGS. 3A and 3B, a cylindrical element 45, which is fixed to the chassis 3, is mounted in a corresponding recess 47 of the rocker 31 so that it can rotate about the chassis rotation axis B. The chassis-side bearing surface 43 is provided by an outer circumference of the cylindrical element 45. Alternatively, it would also be conceivable that an extension of the rocker 31 could be mounted in a corresponding recess of a chassis-fixed element so that it could rotate about the chassis rotation axis B. In this case, an inner circumferential surface of the recess would provide the chassis-side bearing surface 43.

The undercarriage rotation axis A and the chassis rotation axis B are parallel to each other and run in a transverse direction perpendicular to the paving direction of travel F.

As shown in FIG. 2, the first end of the length-variable adjustment element 33 is connected to a chassis-side link point 49, so that it can be rotated about a rotation axis E. A second end of the length-variable adjustment element 33 is connected to a rocker-side link point 51 so that it can be rotated about a rotation axis G. The length-variable adjustment element 33 thus connects the chassis-side link point 49 with the rocker-side link point 51. The rotation axis E and the rotation axis G are parallel to each other as well as to the chassis rotation axis A and the undercarriage rotation axis B and run in a transverse direction perpendicular to the paving direction F.

In the illustrated embodiment, the length-variable adjustment element 33 is a hydraulic cylinder. However, it would also be conceivable to provide another length-variable adjustment element 33, such as a spindle drive. The length-variable adjustment element 33 can be actuated by means of an adjustment element actuator 53 to adjust its length steplessly. By changing the length of the length-variable adjustment element 33 by means of the adjustment element actuator 53, a distance between the chassis-side link point 49 and the rocker-side link point 51 is changed. This changes the position of rocker 31 in relation to undercarriage 5 and chassis 3 and thus lifts or lowers chassis 3 in relation to undercarriage 5.

The length-variable adjustment element 33 extends at least essentially along a horizontal direction. In the embodiment shown, the chassis-side link point 49 is located behind the chassis rotation axis B and the chassis rotation axis A with respect to the paving direction F. However, it would also be conceivable that the chassis-side link point 49 would be located in front of the chassis rotation axis B and/or the chassis rotation axis A with regard to paving direction F.

Figure 4A:
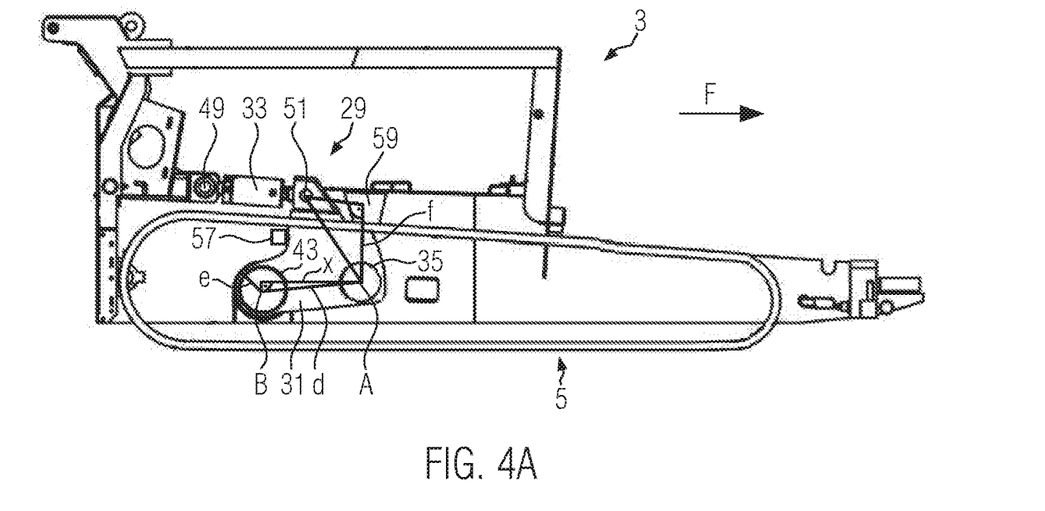
FIG. 4A shows a schematic side view of the undercarriage and chassis of the road finisher according to the embodiment in a maximum lowered position of the chassis.

FIG. 4A shows the chassis 3 in a maximum lowered position compared to the undercarriage 5. In the illustrated embodiment this corresponds to a minimum length of the length-variable adjustment element 33. In the maximum lowered position of chassis 3 the chassis 3 is secured against further lowering by the engagement of the rocker 31 with a lower abutment 57 provided on chassis 3. If, from the position shown in FIG. 4A, the length of the length-variable adjustment element 33 is increased by means of the adjustment element actuator 53, the distance between the chassis-side link point 49 and the rocker-side link point 51 increases. In the view shown in FIG. 4A, the rocker 31 is rotated clockwise about the undercarriage rotation axis A, which runs into the center of the drawing plane through the extension 41 of the rocker 31. This lifts the chassis 3 due to the bearing of the rocker 31 on the chassis-side bearing surface 43 which can be rotated around the chassis rotation axis B.

Figure 4B:
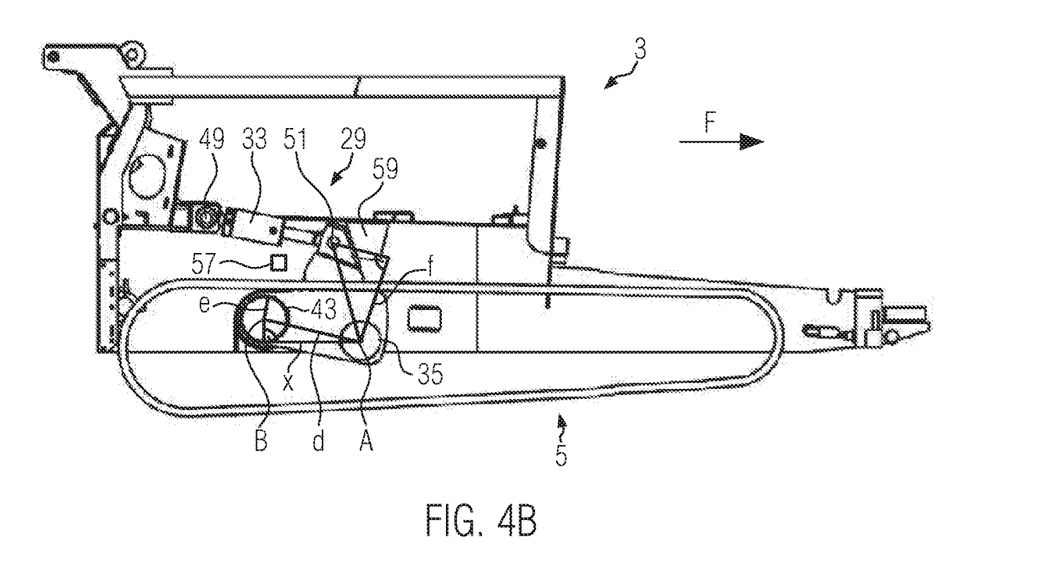
FIG. 4B shows a schematic side view of the undercarriage and chassis of the road finisher according to the embodiment in a maximum lifted position of the chassis.

If the length of the length-variable adjustment element 33 is extended further, the state shown in FIG. 4B is finally reached. FIG. 4B shows a maximum lifted state of the chassis 3 in relation to the undercarriage 5. In this state the rocker 31 comes into engagement with an upper abutment 59 provided on the chassis 3, which prevents further extension of the length of the length-variable adjustment element 33 and thus further pivoting of the rocker 31 around the undercarriage rotation axis A. Alternatively, it would also be conceivable that the length-variable adjustment element 33 is extended to its maximum length before the rocker 31 engages with the upper abutment 59. In such a version, the upper abutment 59 could serve as a safety device against overturning (swinging through) of the lifting device 29.

By again reducing the length of the length-variable adjustment element 33 the chassis 3 can be lowered again from the position shown in FIG. 4B. Preferably the height of chassis 3 can be steplessly adjusted between the minimum lifted state and the maximum lifted state by suitable adjustment of the length-variable adjustment element 33. However, it would also be conceivable to provide several discrete adjustment options.

As shown in FIG. 3A and FIG. 3B, a locking element 61 designed as a locking bolt is provided in the illustrated embodiment for mechanically locking the rocker 31 in a defined relative position with respect to the chassis 3. The locking element 61 is provided at the chassis 3 and can be extended laterally in a horizontal plane perpendicular to the paving direction F by means of a locking element actuator 62 in order to engage a locking structure 63 of the rocker 31 in an extended position. In the illustrated embodiment, the locking structure 63 of the rocker 31 is designed as a recess. In particular, the locking structure 63 may be formed as a recess in a shape corresponding to the shape of the locking element 61. It would also be conceivable to form the locking structure 63 in the form of a slot in order to increase the reliability of locking. By locking engagement of the locking element 61 with the locking structure 63 of the rocker 31, the rocker 31 is fixed against changing its relative position in relation to the chassis 3 and the undercarriage 5. This allows the chassis 3 to be mechanically secured at a predefined transport height in relation to the undercarriage 5. This condition is particularly suitable for transporting the road finisher 1 between construction sites. If the chassis 3 is at the transport height, it is preferable that a maximum height of the road finisher 1 does not exceed 4 m, 3.1 m or 3 m. The roof of the main control station 25 may thereby be folded down or not folded down.

FIG. 3A shows the locking element 61 in the release state in which it does not cause any mechanical locking of the chassis 3 with respect to the undercarriage 5. FIG. 3B shows the locking element 61 in the locked state by mechanically locking the chassis 3 in the transport height with respect to the undercarriage 5.

As shown amongst other things in FIGS. 4A and 4B, a distance d between the chassis rotation axis B and the undercarriage rotation axis A is greater than a distance e between the chassis rotation axis B and the chassis-side bearing surface 43. The undercarriage rotation axis A is therefore outside the bearing of the rocker 31 on the chassis 3. This results in an improved power transmission when lifting the chassis 3. In addition, it can be seen that the lifting device 29 can be designed to be compact.

FIGS. 4A and 4B schematically illustrate the absolute value f of the part of the connection vector between the rocker-side linkage point 51 and the undercarriage rotation axis A which is perpendicular to the longitudinal extension direction of the length-variable adjustment element 33. In addition, the absolute value x of the part of the connection vector extending in a horizontal direction between the undercarriage rotation axis A and the chassis rotation axis B is shown schematically. Preferably, the ratio of these absolute values, f/x, is greater than 0.5, as 0.7, as 1, as 1.3, as 1.5 or as 2. Thus, due to a leverage effect, particularly good power transmission is achieved when lifting or holding the chassis 3 by the length-variable adjustment element 33.

Figure 5:
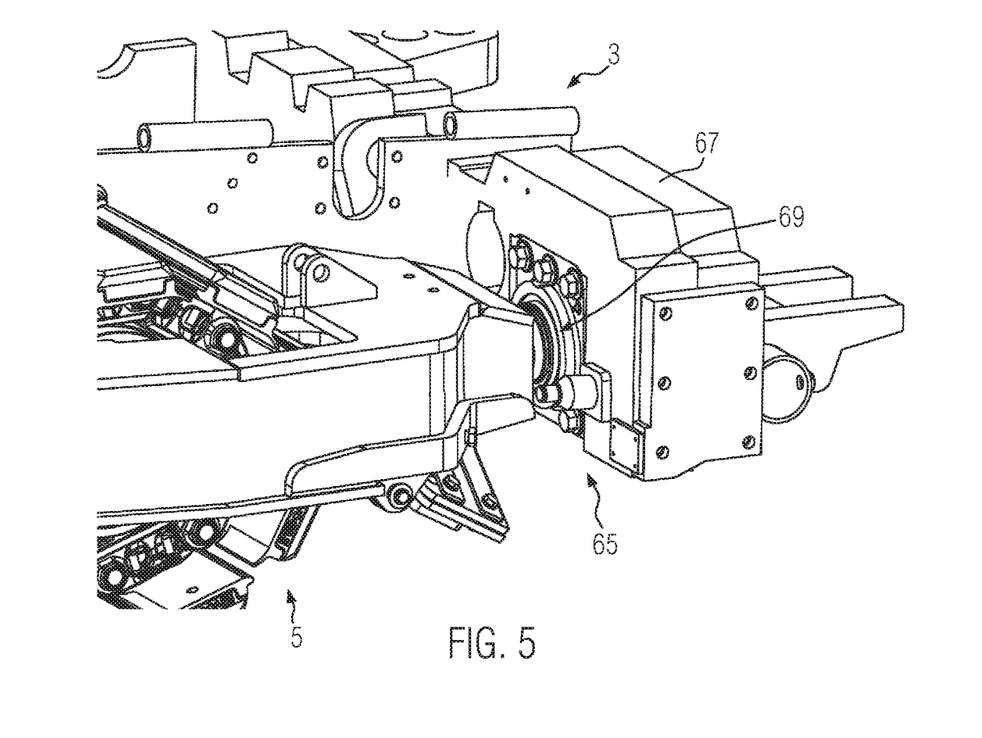
FIG. 5 shows a schematic perspective view of a right-hand connecting area between the undercarriage and the chassis, located at the front of the road finisher in the direction of travel in accordance with the embodiment.

In the illustrated embodiment, chassis 3 can be swiveled in a front region of road finisher 1 with respect to paving direction F, and is mounted on undercarriage 5 with the possibility of longitudinal displacement with respect to paving direction F. In this way, chassis 3 can be lifted or lowered in the rear region of the road finisher 1 relative to undercarriage 5 without creating tension in the front region of the road finisher 1. It is possible to lift chassis 3 asymmetrically in such a way that chassis 3 is lifted further in the rear region of the road finisher 1 than in the front region of the road finisher 1. FIG. 5 shows in a sectional schematic side view an attachment region 65 between the undercarriage 5 and the chassis 3 located on the right side of the road finisher 1. On the left side of the road finisher 1 there could be an analogous attachment region 65. The undercarriage 5 can be pivoted and is mounted on a bearing block 67 of chassis 3 so that it can be displaced longitudinally in relation to paving direction F. In particular, undercarriage 5 can be mounted on bearing block 67 by means of a pivoting bearing 69 with integrated sliding bearing.

Figure 6:
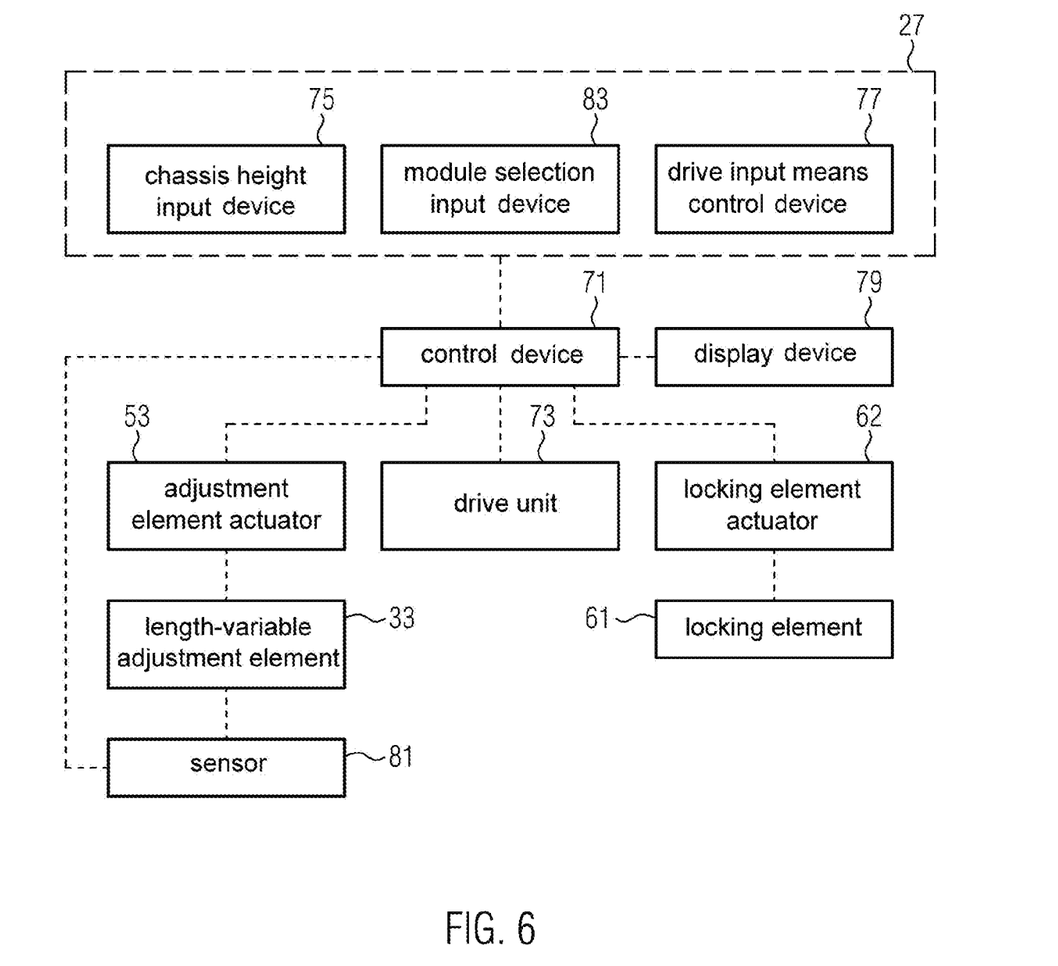
FIG. 6 shows a schematic block diagram to illustrate the function of the control device of the road finisher according to the embodiment.

With reference to the block diagram shown in FIG. 6, control and operation of the lifting device 29 for lifting and lowering the chassis 3 is described in more detail. The road finisher 1 comprises a control device 71 which is adapted to adjust the length of the length-variable adjustment element 33 and thus the height of the chassis 3 relative to the undercarriage 5 by controlling the lifting device 29, particularly by controlling the adjustment element actuator 53. Preferably the chassis 3 is steplessly height adjustable between the minimum lifted state and the maximum lifted state. It would also be conceivable to provide several discrete adjustment options, either additionally or alternatively. The control device 71 is also configured to control the locking element actuator 62, in order to optionally move the locking element 61 into the locked state, in which it mechanically locks the rocker 31 in a defined relative position with respect to the chassis 3 corresponding to a transport height of the chassis 3, or into the release state, in which the mechanical locking of the rocker 31 in the defined relative position with respect to the chassis 3 is released. The control device 71 can also be configured to control a drive unit 73 for the driving function of road finisher 1. Of course, further functions of the road finisher 1 can also be controlled by the control device 71.

An operator can transmit function instructions and settings to control device 71 using the input device 27 of the main control station 25.

In particular, the input device 27 can comprise a chassis height input device 75 by means of which the operator can set a desired relative position between the chassis 3 and the undercarriage 5 (height adjustment). It is conceivable that the operator could enter a value corresponding to a specific position of chassis 3 using chassis height input device 75. Alternatively or additionally, it would also be conceivable that the chassis height input device 75 could be used to set the height of chassis 3 by entering a desired change compared to a currently set state.

The input device 27 can also include a drive input device 77, by means of which the operator can set a desired driving speed and driving direction of the road finisher 1 and preferably also activate or deactivate the driving unit 73 of the road finisher 1.

Preferably, a display device 79, in particular a display, is also provided at the main control station 25, which is controlled by the control device 71 to indicate a current lifting position of chassis 3 relative to undercarriage 5. The control device 71 can receive corresponding data from a sensor 81 which, for example, determines an instantaneous length of the length-variable adjustment element 33 or a corresponding value. By means of the display device 79 the operator is always informed about the current operating state of the lifting device 29.

Different modes of operation of the road finisher 1 are provided, which can be used depending on the operating situation in order to enable operation of the road finisher 1 to be adapted to the respective situation. For this purpose, the input device 27 comprises a mode selection input device 83 by means of which an operator can select a corresponding operating mode.

The operator can select a transfer operating mode using the mode selection input device 83. The transfer operating mode for transport travels is adapted for moving the road finisher 1 between paving jobs. The control device 71 is configured to bring chassis 3 to the predetermined transport height with respect to undercarriage 5 by appropriately controlling the adjustment actuator 53 when the transfer operating mode is selected. After moving the chassis 3 to the transport height, the control device 71 controls the locking element actuator 62 to mechanically fix the position of the rocker 31 with respect to the chassis 3, mechanically securing the chassis 3 at the transport height. This ensures that the chassis 3 is adequately secured in its position even at faster driving speeds of the road finisher 1, as can occur during the transfer of the road finisher 1. In the transfer operating mode, the control device 71 is preferably adapted to limit the driving speed of the road finisher 1 to a predetermined maximum value, for example less than 25 meters per minute, until the chassis 3 is moved to the transport height and the rocker 31 is mechanically secured by means of the locking element 61. Higher travel speeds can then be released. In the transfer mode, the chassis height input device 75 is preferably switched to be ineffective, so that it is not possible to adjust the chassis height from the transport height. In the transfer operating mode, the control device 71 allows both a forward as well as a reverse drive of the road finisher 1.

Another operating mode that can be set using the mode selection input device 83 is a setting operating mode. This mode is particularly suitable for positioning and adjusting the road finisher 1 immediately before paving begins, thus bringing it into a suitable starting condition. The control device 71 is configured to automatically set the locking element 61 to the release state (unless the locking element 61 is already in the release state) when the setting operating mode is selected. In addition, the control device 71 is configured to perform height adjustment of the chassis 3 in the setting operating mode by controlling the adjustment element actuator 53 based on user input made by means of chassis height input device 75 or on an automatic setting program. The height of chassis 3 can be adjusted either while the road finisher 1 is stationary or while driving. In the setting operating mode, the control device 71 both allows a forward as well as a reverse drive of the road finisher 1.

In addition, a paving operating mode can be selected using the mode selection input device 83. The control device 71 is configured to bring the locking element 61 into the release state when the paving mode is selected, at least if the locking element 61 is not already in the release state. The control device 71 is configured to perform, in the paving mode, height adjustment of chassis 3 with respect to undercarriage 5 by controlling the adjustment element actuator 53 based on user inputs made by means of chassis height input device 75 or on an automatic paving program. In the paving operating mode, the control device 71 allows a forward drive, hover prevents a reverse drive of the road finisher.

Preferably, the control device 71 is configured to adjust the length of the length-variable adjustment element 33 in the setting operating mode at a greater adjustment speed than in the paving operating mode. This allows the road finisher 1 to quickly be ready for use when paving, while the slower adjustment speed prevents a deterioration in road quality due to abrupt adjustments.

A neutral operating mode can also be selected using the mode selection input device 83. In neutral operating mode, the control device 71 does not allow the lifting device 29 to be operated, in particular the length of the length-variable adjustment element 33 cannot be changed.

In addition to or alternative to the chassis height input device 75, the mode selection input device 83 and the drive input device 77 of the input device 27 of the main control station 25, a chassis height input device 75, a mode selection input device 83 and a drive input device 77 of corresponding configuration may also be provided on the input device 27 of the external control station 28. It is also possible to provide the display 79 or an additional display 79 on the external control station 28.

What is claimed is:

1. A road finisher comprising:
an undercarriage;
a chassis;
a hopper, which is mounted on the chassis at a front of the road finisher with respect to a paving direction for receiving paving material;
a paving screed provided at a rear of the road finisher with respect to the paving direction for compacting paving material;
tie bars attaching the paving screed to the chassis;
a lifting device configured to lift the chassis relative to the undercarriage at least in a rear region of the road finisher;
a locking element movable between a locked state, in which the locking element mechanically locks the chassis at a predefined transport height relative to the undercarriage, and a release state, in which the mechanical locking of the chassis at the predefined transport height is released; and a locking element actuator for moving the locking element between the locked state and the release state.

2. The road finisher according to claim 1 further comprising:

a control device configured to control the lifting device to selectively lift or lower the chassis with respect to the undercarriage and to control the locking element actuator to move the locking element between the locked state and the release state; and a mode selection input device by which a user can select from one of a plurality of operating modes of the road finisher, the control device configured to control the lifting device and the locking element actuator according to different control schemes depending on the selected operating mode.

3. The road finisher according to claim 2 wherein a neutral operating mode is selectable by the mode selection input device, wherein the control device is configured to prevent, in the neutral operating mode, adjustment of the chassis height by the lifting device.

4. The road finisher according to claim 2 further comprising a display device, the control device configured to control the display device to display a current lifting state of the chassis relative to the undercarriage.

5. The road finisher according to claim 2 wherein a transfer operating mode is selectable by the mode selection input device, wherein the control device is configured to automatically bring the chassis to the predefined transport height by controlling the lifting device when the transfer operating mode is selected, and after moving the chassis to the predefined transport height to control the locking element actuator to move the locking element to the locked position.

6. The road finisher according to claim 5 wherein the control device is configured to limit a driving speed of the road finisher to a predetermined maximum value in the transfer operating mode until the chassis is locked at the predefined transport height and then to release a higher driving speed.

7. The road finisher according to claim 5 wherein the control device is configured to allow both forward drive and reverse drive of the road finisher in the transfer operating mode.

8. The road finisher according to claim 2 wherein a setting operation mode is selectable by the mode selection input device, wherein the control device is configured to automatically bring the locking element into the release state when the setting operation mode is selected, and in the setting operation mode to perform a height adjustment of the chassis by controlling the lifting device based on user input and/or an automatic setting program.

9. The road finisher according to claim 8 wherein the control device is configured to allow both forward driving and reverse driving of the road finisher in the setting operating mode.

10. The road finisher according to claim 8 wherein the control device is configured to adjust the chassis height at a higher adjustment speed in the setting operating mode than in the paving operating mode.

11. The road finisher according to claim 2 wherein a paving operating mode is selectable by the mode selection input device, wherein the control device is configured to automatically bring the locking element into the release state when the paving operating mode is selected, and to perform a height adjustment of the chassis in the paving operating mode by driving the lifting device based on user input or an automatic paving program.

12. The road finisher according to claim 11 wherein the control device is configured to permit forward driving of the road finisher and to prevent reverse driving of the road finisher in the paving operating mode.

13. The road finisher according to claim 1 wherein the lifting device comprises a rocker mounted rotatably about an undercarriage rotation axis on an undercarriage-side bearing surface and mounted rotatably about a chassis rotation axis on a chassis-side bearing surface, wherein the lifting device further comprises a length-variable adjustment element connecting a chassis-side link point to a rocker-side link point and configured to change, by changing its length, a distance between the chassis-side link point and the rocker-side link point and to thereby selectively lift or lower the chassis relative to the undercarriage.

14. The road finisher according to claim 13 wherein a lower abutment is disposed at the chassis, the lower abutment configured to secure the chassis against further lowering by engagement with the rocker in a maximum lowered state of the chassis.

15. The road finisher according to claim 13 wherein an upper abutment is disposed at the chassis, the upper abutment configured, in a maximum lifted state of the chassis, to secure the chassis against further lifting by engagement with the rocker.

16. The road finisher according to claim 13 wherein an upper abutment is disposed at the chassis and serve as a safety device against overturning of the lifting device.

17. The road finisher according to claim 13 wherein an upper abutment is disposed at the chassis, the upper abutment configured, in a maximum lifted state of the chassis, to secure the chassis against further lifting by engagement with the rocker and/or which serves as a safety device against overturning of the lifting device.

18. The road finisher according to claim 13 wherein the locking element is configured to mechanically lock the rocker in a defined relative position with respect to the chassis in which the chassis is at the predefined transport height.

* * * * *